United States Patent
Elichai et al.

(10) Patent No.: US 10,250,431 B2
(45) Date of Patent: Apr. 2, 2019

(54) SYSTEM AND METHODS THEREOF FOR OPTIMIZING COMMUNICATION BETWEEN A CIVILIAN AND DIFFERENT DISPATCHERS

(71) Applicant: Carbyne Ltd., Tel-Aviv (IL)

(72) Inventors: Amir Elichai, Tel Aviv (IL); Alex Dizengof, Tel Aviv (IL)

(73) Assignee: Carbyne Ltd., Tel-Aviv (IL)

( * ) Notice: Subject to any disclaimer, the term of this patent is extended or adjusted under 35 U.S.C. 154(b) by 64 days.

(21) Appl. No.: 15/697,144

(22) Filed: Sep. 6, 2017

(65) Prior Publication Data

US 2017/0366387 A1    Dec. 21, 2017

Related U.S. Application Data

(63) Continuation of application No. PCT/IL2016/051245, filed on Nov. 21, 2016.
(Continued)

(51) Int. Cl.
*H04L 29/06* (2006.01)
*G11B 20/10* (2006.01)
(Continued)

(52) U.S. Cl.
CPC ........ *H04L 29/06027* (2013.01); *G11B 20/10* (2013.01); *H04L 45/00* (2013.01);
(Continued)

(58) Field of Classification Search
CPC ............... H04L 29/06027; H04L 45/00; H04L 65/1069; H04L 67/141; H04M 7/0057;
(Continued)

(56) References Cited

U.S. PATENT DOCUMENTS

| 2003/0086539 A1 | 5/2003 | McCalmont et al. |
| 2010/0202368 A1* | 8/2010 | Hans ............ H04M 3/5116 370/329 |

(Continued)

FOREIGN PATENT DOCUMENTS

| WO | 2013086244 A1 | 6/2013 |
| WO | WO 2018/092120 | 5/2018 |

OTHER PUBLICATIONS

The International Search Report for International Application No. PCT/IL2016/051245 dated Mar. 30, 2017, ISA/IL, Israel Patent Office, Jerusalem, Israel.

*Primary Examiner* — Jae Y Lee

(57) ABSTRACT

A system for optimizing communication between civilians and authorities. The system enables optimal routing of message delivery from civilians to different dispatchers. The system enables adaptive optimization of the delivery of such messages by continuously identifying data collected by an agent installed on a user device. The messages typically comprise one or more portions, such as data, call, multimedia, etc. The system further identifies the communication target to which the message is sent. The system then determines an optimal route for sending each of the portions of the message. According to an embodiment, the determination may further be made based on metadata associated with the location of the user device. Then, each portion of the message is sent to the communication target via the optimal route.

21 Claims, 6 Drawing Sheets

Related U.S. Application Data

(60) Provisional application No. 62/259,092, filed on Nov. 24, 2015.

(51) Int. Cl.
| | |
|---|---|
| *H04M 3/22* | (2006.01) |
| *H04W 4/70* | (2018.01) |
| *H04L 29/08* | (2006.01) |
| *H04L 12/701* | (2013.01) |
| *H04M 3/51* | (2006.01) |
| *H04M 7/00* | (2006.01) |
| *H04M 7/12* | (2006.01) |

(52) U.S. Cl.
CPC ........ *H04L 65/1069* (2013.01); *H04L 67/141* (2013.01); *H04M 3/2281* (2013.01); *H04M 3/5116* (2013.01); *H04M 7/0057* (2013.01); *H04M 7/1285* (2013.01); *H04W 4/70* (2018.02)

(58) Field of Classification Search
CPC ............. H04M 7/1285; H04M 3/5116; H04M 3/2281; H04W 4/70; G11B 20/10
See application file for complete search history.

(56) References Cited

U.S. PATENT DOCUMENTS

| | | |
|---|---|---|
| 2012/0002646 A1 | 1/2012 | Zabawskyj et al. |
| 2014/0036769 A1* | 2/2014 | Stojanovski ............ H04W 4/70 370/328 |
| 2015/0119103 A1* | 4/2015 | Ngai ...................... H04W 48/18 455/552.1 |
| 2015/0326636 A1* | 11/2015 | Surmay ................. H04W 76/10 370/259 |
| 2016/0261554 A1 | 9/2016 | Li |
| 2017/0105038 A1* | 4/2017 | Subramanya ...... H04N 21/4307 |

\* cited by examiner

SYSTEM AND METHODS THEREOF FOR OPTIMIZING COMMUNICATION BETWEEN A CIVILIAN AND DIFFERENT DISPATCHERS

CROSS REFERENCE TO RELATED APPLICATIONS

This application is a continuation of International Application No. PCT/IL2016/051245, filed Nov. 21, 2016. The International Application claims the benefit of U.S. Provisional Application No. 62/259,092, filed Nov. 24, 2015. Both applications are incorporated herein by reference.

TECHNICAL FIELD

The disclosure generally relates to optimizing delivery of communications sent via user devices, and more specifically to a system and methods for optimizing the sending of communication to specific communication targets.

BACKGROUND

Communication routing is a process of getting information packets where they need to go. Communication routing is a surprisingly complicated task, and there are a number of different algorithms used to find the shortest route between two points. A further complicated task is finding the optimal communication routing under certain circumstances.

Common is the case that civilians find themselves in a need to report to a municipal authority or an emergency line of an incident in their proximity. Currently the process of a civilian reporting an incident via a mobile device is not straightforward, especially in cases where the report includes several different communication portions, for example voice and data.

In some cases, users simply upload the video content to social networks, such as Facebook®, YouTube® or Instagram®, and therefrom it finds its way to the police or broadcasting networks. In some other cases, this is performed by contacting the desired consumer of the media content and uploading in one of a variety of mechanisms the content to that consumer. While a reasonable, though suboptimal, solution in certain cases, it is not of value in cases where the content in valuable if transmitted in real-time.

In certain security systems, such as discussed, for example, in U.S. patent application Ser. Nos. 13/004,705 by Reitnour and 13/604,372 by Reitnour et al., a notification and tracking system for a mobile device is described which may further be used by the authorities. However, these proposed systems are deficient in cases of an on-going incident where a large number of callers attempt to report the incident or deliver media content respective thereto.

Furthermore, different mobile devices have different communication patterns and therefore a customized way for optimally sending reports via mobile devices is of the essence. Nevertheless, different dispatchers have different communication architectures and therefore a method for optimally delivering the report to different dispatchers based on their architectures is required. In view of the deficiencies of the prior art solutions to allow easy connectivity for content delivery from a user device to a content consumer in cases of emergency, it would be advantageous to provide a solution that overcomes these deficiencies.

SUMMARY

A summary of several example aspects of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all aspects nor delineate the scope of any or all aspects. Its sole purpose is to present some concepts of one or more embodiments in a simplified form as a prelude to the more detailed description that is presented later. For convenience, the term some or certain embodiments may be used herein to refer to a single embodiment or multiple embodiments of the disclosure.

Certain embodiments disclosed herein include a method for optimizing a communication delivery request, the method including: identifying first metadata related to a type of a user device sending the communication delivery request, wherein the communication delivery request includes a voice call and data; identifying second metadata related to a target of the communication delivery request; identifying third metadata related to a type of current network connection; determining a first optimal route for sending the voice call and a second optimal route for sending the data, wherein the determination is based on the identified first metadata, second metadata and third metadata; routing the voice call over the first optimal route; and routing the data over the second optimal route.

BRIEF DESCRIPTION OF THE DRAWINGS

The subject matter that is regarded as the disclosure is particularly pointed out and distinctly claimed in the claims at the conclusion of the specification. The foregoing and other objects, features and advantages of the disclosure will be apparent from the following detailed description taken in conjunction with the accompanying drawings.

DETAILED DESCRIPTION

Figure 1:
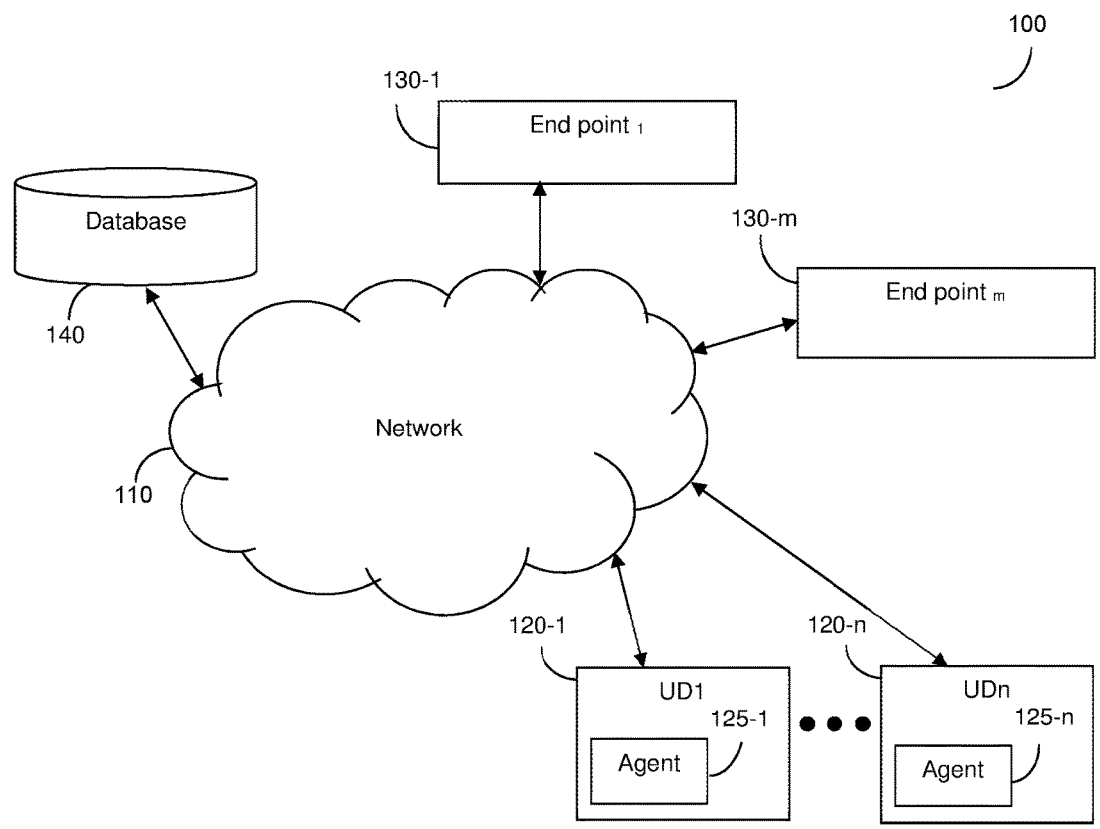
FIG. 1 is a schematic block diagram of a system for delivering communications from a user device to certain targets according to an embodiment.

It is important to note that the embodiments disclosed by the disclosure are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality. In the drawings, like numerals refer to like parts through several views.

A system and methods thereof for optimizing communication between a civilian and different dispatchers. The system enables optimal routing of message delivery from civilians to different dispatchers. The system enables adaptive optimization of the delivery of such messages by continuously identifying data collected by an agent installed on a user device. The messages typically comprise one or more portions, such as data, call, multimedia, etc. The system further identifies the communication target to which the message is sent to. The system then determines an optimal route for sending each of the portions of the message. According to an embodiment, the determination may further be made based on metadata associated with the location of the user device. Then, each portion of the message is sent to the communication target via the optimal route.

FIG. 1 shows an exemplary and non-limiting schematic diagram of a system 100 for delivering live streaming data and a voice call sent to a communication target in accordance with an embodiment. The system 100 comprises a network 110 which enables communication between different elements of the system 100 communicatively coupled to the network 110. The network 110 may be a cellular, wired, wireless, local area network (LAN), wide area network (WAN), metro area network (MAN), the Internet, the worldwide web (WWW), and any combination thereof. One or more user devices (UDs) 120, are communicatively coupled to the network 110, for example UD 120-1 through 120-n, where 'n' is an integer having a value of '1' or larger. Each UD 120 is a communication device configured to capture data and stream the captured data in real time over the network 110. The UD 120 may be, for example, a smart phone, a mobile phone, a laptop, a tablet computer, a wearable computing device, a personal computer (PC) and the like. Each of the user devices 120 has an agent 125 installed therein. The agent 125 can be implemented in hardware, software, microcode, firmware or any combination thereof.

Also communicatively coupled to the network 110 are one or more end point devices 130-1 through 130-m, to which the communication is sent, associated with the outgoing communication's target. The end point devices 130 are associated with dispatchers such as for example, a police dispatcher, a municipal dispatcher, etc. Further coupled to the network 110 is a database 140 configured to collect content sent from the user devices 120 for further processing and future usage.

According to an embodiment, the agent 125 may be configured to deliver a communication from the user device 120 to an end point device 130. The communication includes several portions where at least one of the portions is a voice call. In addition to the voice call, a data portion may further be included. The data may be, for example, an image, a video, a video stream, a clip, location data, time data, etc. As an example, in case a citizen identifies an alleged car hijacking incident, an outgoing communication that comprises both verbal description of the incident as well as a video showing the incident shall assist the designated law enforcement in assisting and/or solving the incident. Subject to a type of the user device 120, i.e., whether it is a tablet or a PC, etc., dividing the communication to different routes may be required in order to optimally deliver the communication.

According to an embodiment, the agent 125 may be configured to receive a request to deliver the communication from the user device 120 to an end point device 130. The request may include at least a voice call and at least one data, such as video, image, etc.

Then the agent 125 may be configured to identify first metadata associated with the user device 120. The first metadata may include, for example, the type of the user device 120, the type of connection the network 110 the user device 120 is currently logged on, the user device 120 location, etc. For example, the type of the user device 120 may be, for example, an iPhone® device operated by an iOS® operating system, or an Android® device, operated by an Android® operating system.

Then, the agent 125 may be configured to identify second metadata associated with at least one communication target based on the request. For example, in case the request is to report on a fire burst in a certain neighborhood, the communication target may be a fire department located in proximity to the neighborhood. The second metadata may include, for example, the communication target telephone number, location of the communication target, etc.

Then, the agent 125 may be configured to identify a third metadata associated with a current network connection. The current network connection is the communication network by which the user device 120 receives and sends multimedia, e.g. audio, images, videos, messages, etc.

Then, the agent 125 may be configured to determine a first optimal route for sending the voice call based on analysis of the first metadata, second metadata and the third metadata. For example, the agent 125 may identify that the cellular network to which the user device 120 is usually connected has collapsed and therefore the optimal route for sending the voice call may be using, for example, a nearby Wi-Fi network.

Then, the agent 125 may be configured to determine a second optimal route for sending the data, e.g. video(s), image(s), text message(s), etc. based on analysis of the first metadata, second metadata and the third metadata. For example, in case the 4G connection is weak and Wi-Fi is not available, the optimal route for sending the data may be via the cellular network. An exemplary embodiment of identification of an optimal route for delivering the voice and data are further described herein below with respect of FIG. 4.

Then, the agent 125 may be configured to route the voice call over the first optimal route. The agent 125 may be further configured to route the data over the second optimal route as further described herein below with respect of FIG. 3.

According to further embodiment, the agent 125 may be configured to identify a location of the user device 120. Using the identification of the location, the agent 125 retrieves metadata from the database 140 based on a plurality of analytics associated with the location of the user device 120 for determining the optimal route for delivering the call and the data. The analytics may refer to the location of the user associated with the user device 120 in certain areas and/or under certain circumstances such as for example, the location of the user device 120 while an emergency call has been made, while a non-emergency call has been made, etc.

Figure 2:
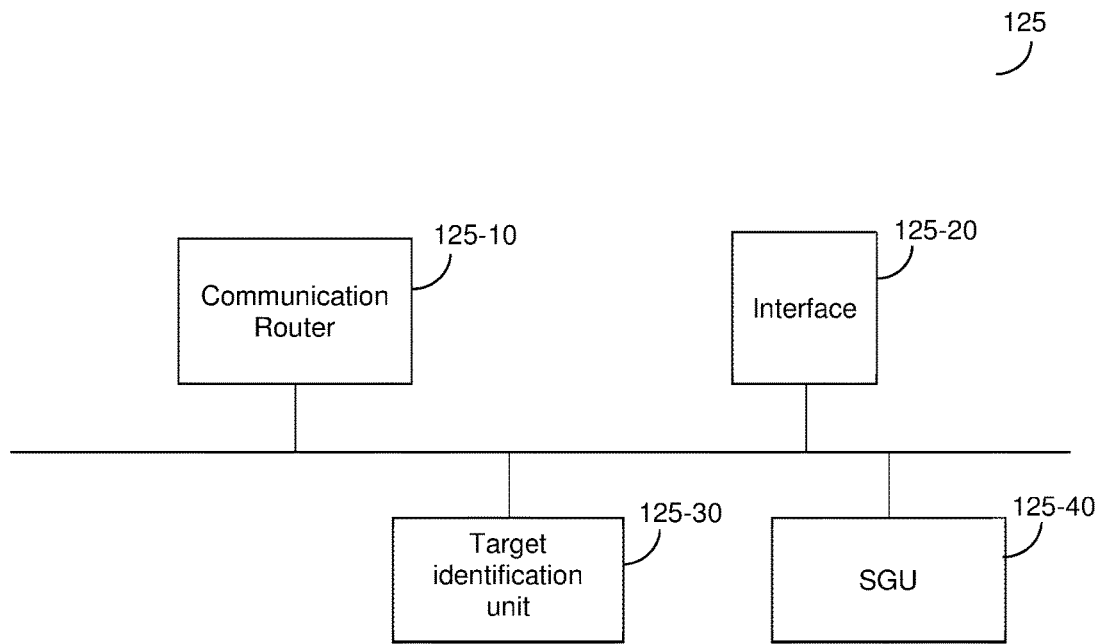
FIG. 2 is a schematic block diagram of an agent installed on a user device that enables execution of the operation of the system according to an embodiment.

FIG. 2 shows an exemplary and non-limiting schematic diagram of an agent 125 installed on the user device 120 configured to execute the operation of optimizing communication according to an embodiment. The agent 125 comprises a communication router 125-10 which enables the agent 125 to communicate and deliver a message comprising a plurality of portions, such as, for example, audio, video and data, via the network 110 to a desirable end point device 130. The agent 125 further comprises an interface 125-20 which enables interaction of a user through the user device 120. Another component of the agent 125 is a target identification unit 125-30 that enables the agent 125 to identify a user's desirable communication target associated with an end point device 130. A signature generation unit (SGU) 125-40 is further comprised on the agent 125 and enables generation of signatures for the voice call and the data. A signature is a computer readable numeric identifier that enables identification of a connection between the portions of the message upon their arrival to the dispatcher.

Figure 3:
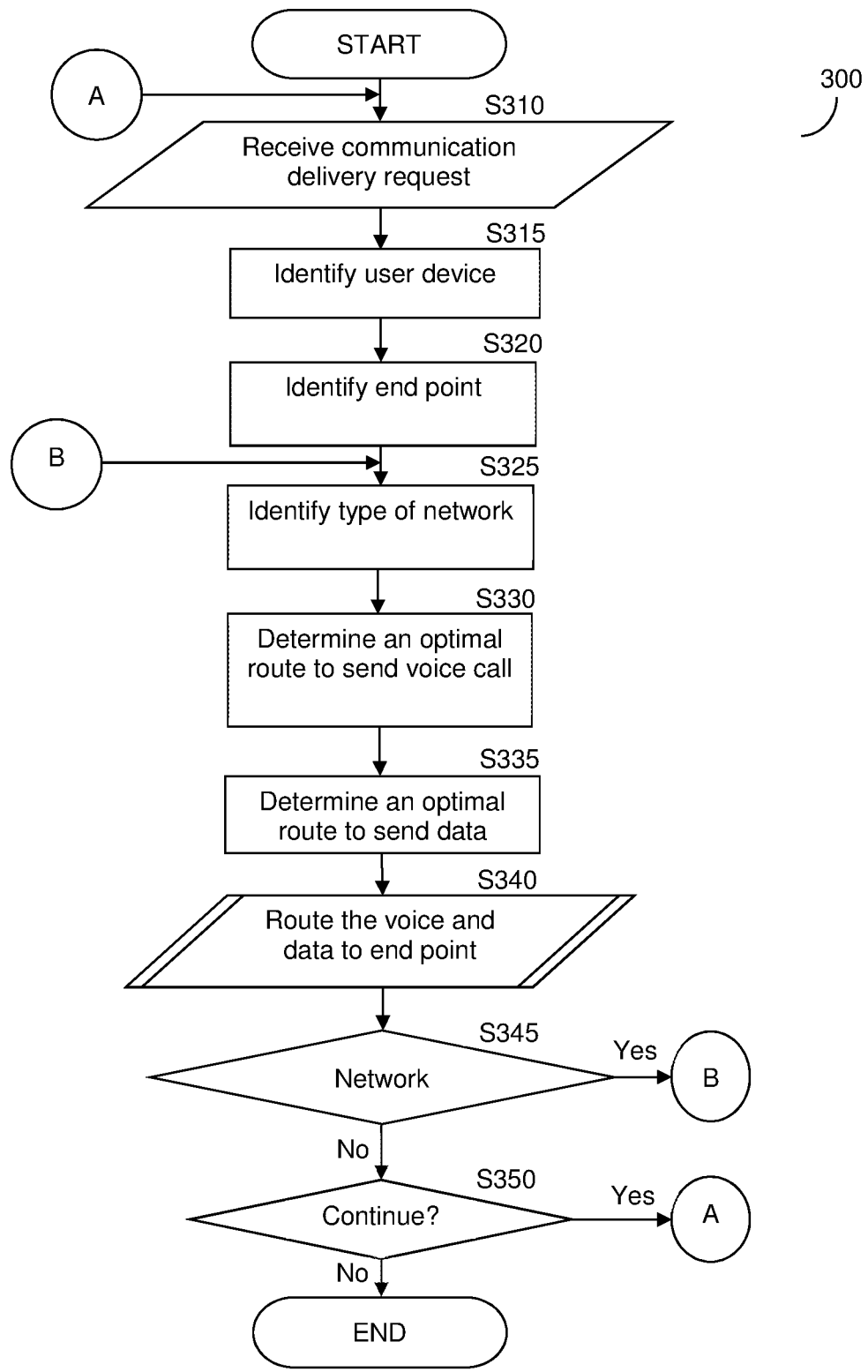
FIG. 3 is a flowchart describing a process of delivering communications from a user device during a voice call to a communication target according to an embodiment.

FIG. 3 depicts an exemplary and non-limiting flowchart 300 of the system 100 for delivering communications from a user device during a voice call to a communication target in accordance with an embodiment. In S310, the operation starts when a communication delivery request is received by the agent 125 installed on the user device 120. The communication includes at least a voice call and at least one data content item such as video, audio and other data.

In S315, the agent 125 identifies first metadata associated with a type of the user device 120. The type of the user device 120 may be, for example, an iPhone® device operated by an IOS® operating system, an Android® device, operated by an Android® operating system, etc. In S320, the agent 125 identifies second metadata associated with an end point device 130 associated with a communication target. The communication target may be an emergency service, non-emergency service, municipal service, authority, etc. In S325, the agent 125 identifies third metadata associated with a type and strength of the network 110 through which the user device 120 is currently logged on. The identification of type and strength of the current network 110 is used for determining thereafter the optimal route for delivering the audio and data. In S330, an optimal route for sending the voice communication is determined.

In S335, an optimal route for sending the data to the end point device 130 is determined based on analysis of the identified first metadata, second metadata and third metadata. In S340, the voice and the data are routed via the optimal route. S340 is further described herein below with respect of FIG. 4.

In S345, it is checked whether the current network and/or the network's performance have changed, based on a predetermined network performance threshold, and if so, execution continues with S325; otherwise, execution continues with S350.

Changes in network performance may include, for example and without limitation, bandwidth consumption, changes to upload rate and/or download rate, a combination thereof, etc. Predetermined network performance threshold is determined by the agent 125, that applies on the network performance and enables to inform the agent 125 when the network performance is too weak.

It should be clear to one of ordinary skill in the art that the agent 125 may be configured to identify a change in current network and/or network's performance as a change which requires intervention, only in cases where the change crosses the predetermined threshold, i.e., not all changes require such intervention. The predetermine network performance threshold may dynamically change based on several variables, such as for example, earlier requests made by the agent 125, data stored in the database 140, feedback from target etc. In S350, it is checked whether to continue the operation and if so, execution continues with S310; otherwise, the execution terminates.

Figure 4:
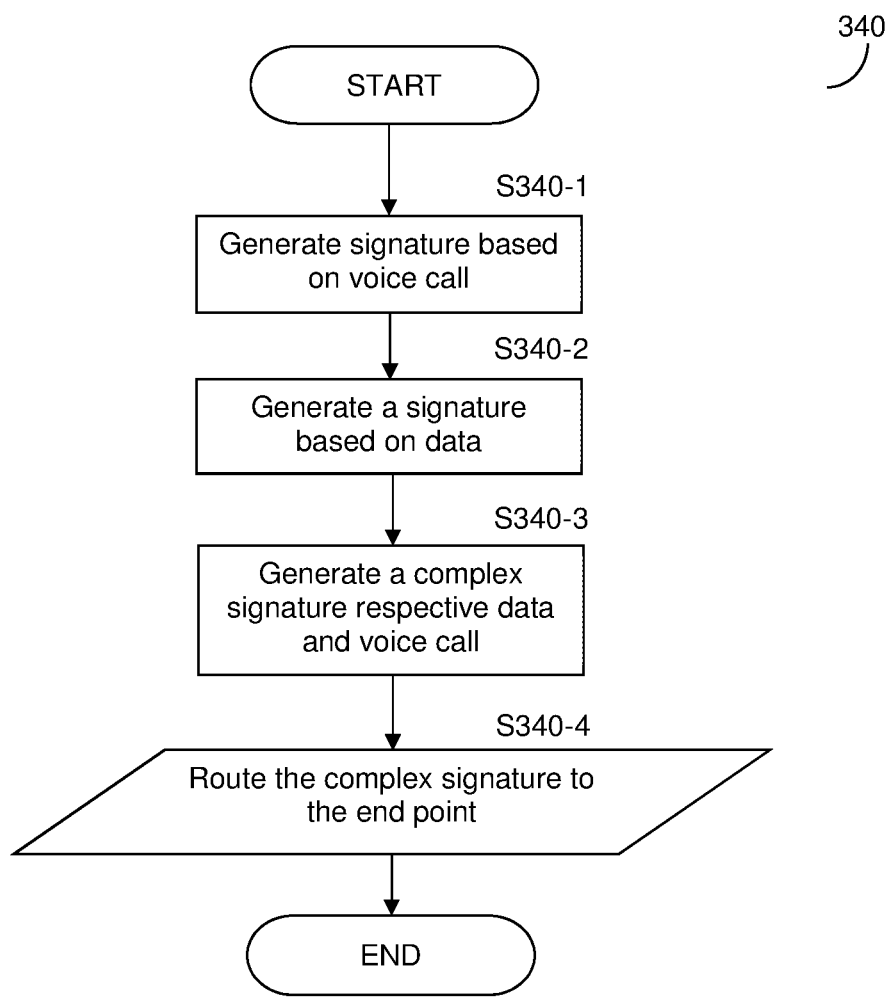
FIG. 4 is a flowchart describing a process of routing a communication packet comprising a voice call as well as data content from a user device to an emergency communication target according to an embodiment.

FIG. 4 depicts an exemplary and non-limiting flowchart 340 describing a process of routing a communication packet comprising a voice call as well as data, e.g. a video, an image, etc. from a user device 120 to an emergency communication target in accordance with an embodiment. In S340-1, the agent 125 generates a first signature associated with the voice call. The generation may be achieved by using a signature generation unit (SGU) 125-40. A signature is a numeral sequence enabling an accurate identification of the voice call and thereafter matching of the signature associated with the voice call to a signature associated with the data. In S340-2, a second signature associated with the data, e.g. video, image, etc. may be generated by the agent 125. In S340-3, a complex signature that includes the first signature and the second signature may be generated by the agent 125. In 340-4, the complex signature is routed to the end point device 130 and the operation terminates. The complex signature enables matching the voice call and the data that were delivered from the user device 120, at the end point device 130.

Figure 5:
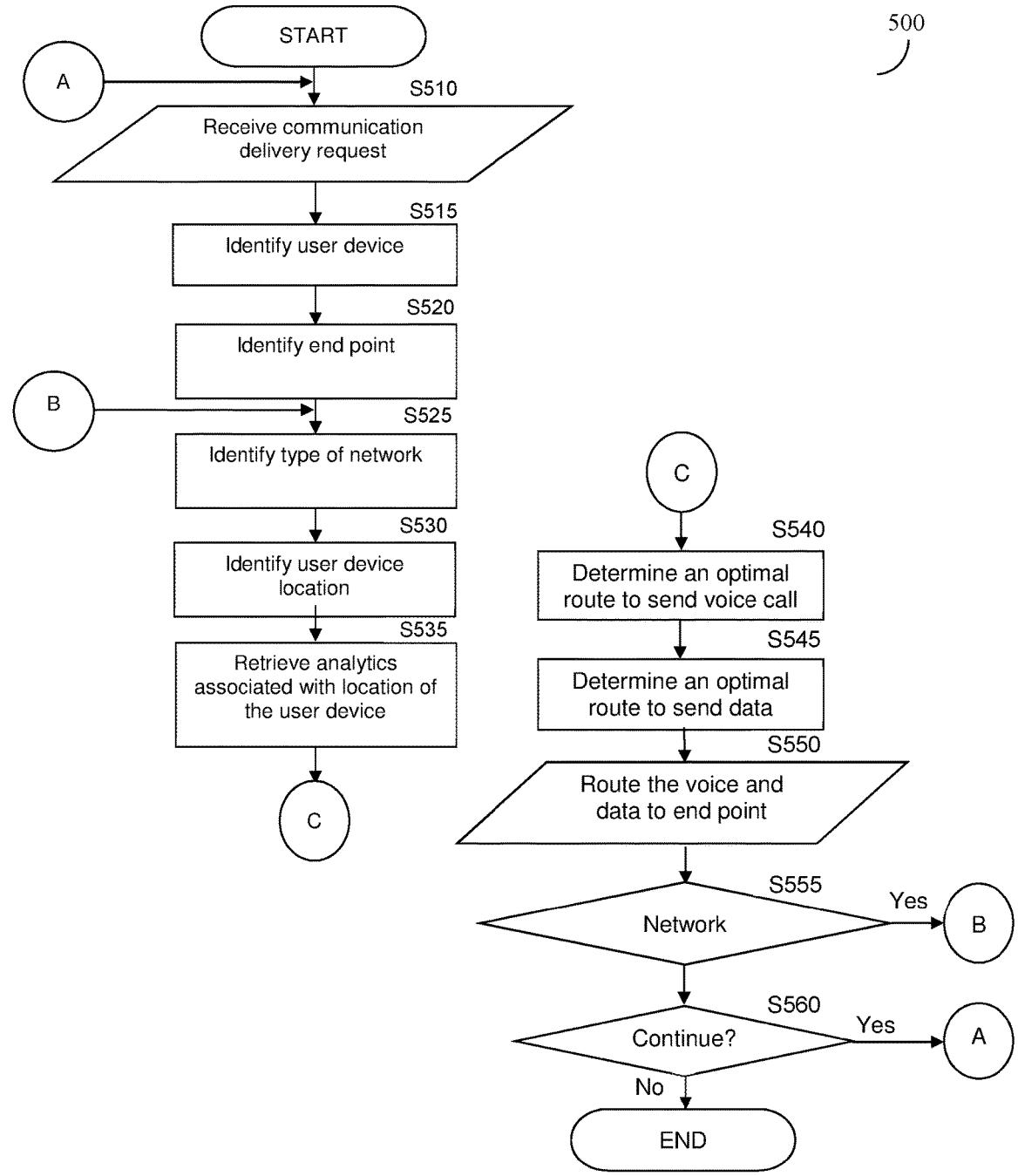
FIG. 5 is a flowchart describing a process of delivering communications from a user device during a voice call to a communication target associated with user device location according to an embodiment.

FIG. 5 depicts an exemplary and non-limiting flowchart 500 of the operation of the system 100 for delivering communications from a user device during a voice call to a communication target associated with the location of the user device 120 in accordance with an embodiment. In S510, the operation starts when a communication delivery request is received by the agent 125 installed on the user device 120. The communication may include at least a voice call and at least one data content item such as video, audio, etc.

In S515, the agent 125 identifies first metadata associated with a type of the user device 120. The type of the user device 120 may be, for example, an iPhone® device operated by an IOS® operating system, an Android® device, operated by an Android® operating system, etc. In S520, the system 100 identifies second metadata associated with an end point device 130 associated with a communication target. The communication target may be an emergency service, non-emergency service, municipal service, etc.

In S525, the agent 125 may be configured to identify third metadata associated with for example a type, strength, etc. of the network 110 through which the user device 120 is currently logged on. The identification of type and strength of the current network 110 may be used for determining thereafter the optimal route for delivering the audio and data.

In S530, the agent 125 may be configured to identify a location pointer at which the user device 120 is currently located. According to an embodiment, the identification is achieved using a Global Positioning System (GPS) installed on the user device 120 and communicatively connected to the agent 125. In S535, the agent 125 retrieves a plurality of analytics from a database 140 associated with the location of the user device 120. The retrieved analytics refer to the location of the user device 120 in certain areas and/or under certain circumstances, such as for example, the location of the user device 120 while an emergency call has been made, while a non-emergency call has been made, etc.

In S540, an optimal route for sending the voice communication is determined based on analysis of the user device 120, the end point device 130, type and strength of the network 110 and the retrieved analytics. In S545, an optimal route for sending the data to the end point device 130 is determined based on analysis of the identified user device 120, the end point device 130, type and strength of the network 110 and the retrieved analytics. In S550, the voice and the data are routed via the optimal route. The process of S550 is further described herein above with respect of FIG. 4. In S555, it is checked whether the current network and/or the network's performance have changed, based on a predetermined network performance threshold, and if so, execution continues with S525; otherwise, execution continues with S560. Changes in network performance may include, for example and without limitations, bandwidth consumption, changes to upload rate and/or download rate, a combination thereof, etc. In S560, it is checked whether to continue the operation and if so, execution continues with S510; otherwise, the execution terminates.

Figure 6:
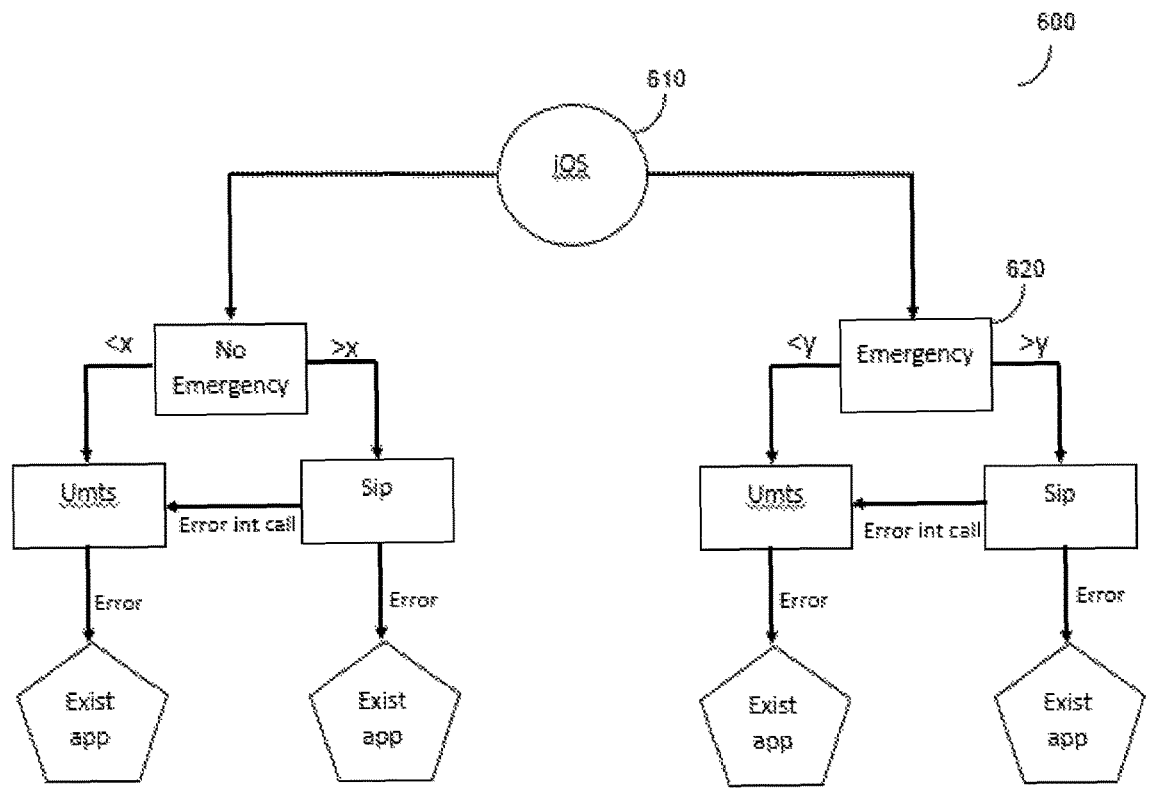
FIG. 6 is a schematic block diagram simulating a decisions' tree for determining an optimal route for delivering a report comprising both voice call and live data according to an embodiment.

FIG. 6 depicts an exemplary and non-limiting schematic diagram 600 of a block diagram of a decision tree for determining an optimal route for delivering a report according to an embodiment. In S610, the type of the user device 120 is identified as an iPhone, so the voice call and the data are routed based on the definitions of the iOS router. In case the user device 120 is not an iPhone®, the type of the connectivity is checked. In S620, the network performance is checked for delivering audio signal. In case an audio signal is to be delivered, and the current network performance is lower than the predetermined minimal network performance threshold, the audio signal will be routed via a UMTS network. In case an audio signal is to be delivered and the current network performance is higher than the predetermined minimal network performance threshold, the audio signal will be routed via session initiation protocol (SIP) protocol. It should be noted that while addressing emergency dispatchers the highest priority may be to deliver at least the voice communication so there may be cases where the video shall not be sent in order to make sure that at least the voice communication is efficiently delivered.

The principles of the disclosure are implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the disclosure and the concepts contributed by the inventor to furthering the art, and are to be construed as being without limitation to such specifically recited examples and conditions. Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

A person skilled-in-the-art will readily note that other embodiments of the disclosure may be achieved without departing from the scope of the disclosed disclosure. All such embodiments are included herein. The scope of the disclosure should be limited solely by the claims thereto.

What is claimed is:

1. A method for optimizing a communication delivery request, the method comprising:
    identifying first metadata related to a type of a user device sending the communication delivery request, wherein the communication delivery request includes a voice call and data;
    identifying second metadata related to a target of the communication delivery request;
    identifying third metadata related to a type of current network connection;
    determining a first optimal route for sending the voice call and a second optimal route for sending the data, wherein the determination is based on the identified first metadata, second metadata and third metadata;
    routing the voice call over the first optimal route; and
    routing the data over the second optimal route.

2. The method of claim 1, further comprising:
    generating a first signature based on the voice call captured by the user device;
    generating a second signature based on the data collected from the user device; and,
    generating a complex signature, wherein the complex signature includes the first signature and the second signature.

3. The method of claim 2, further comprising:
    routing, over the first optimal route, the complex signature to the communication target together with the voice call; and,
    routing, over the second optimal route, the complex signature to the communication target together with the data.

4. The method of claim 1, further comprising:
    monitoring performance of the current network connection;
    modifying the first optimal route and the second optimal route upon detection of changes in the performance of the current network connection; and
    routing the voice call through the modified first optimal route and the data through the modified second optimal route.

5. The method of claim 4, wherein the changes in the performance are determined based on a preconfigured threshold.

6. The method of claim 5, wherein the predetermined performance network threshold is dynamically updated based on at least one of: earlier requests made by the user device, data stored in at least one database, and feedback from a communication target.

7. The method of claim 1, further comprising:
    identifying a current location of the user device.

8. The method of claim 1, wherein the first metadata further comprises a location of the user device.

9. The method of claim 1, further comprising:
    retrieving, from a database, analytics associated with the location of the user device.

10. The method of claim 9, wherein the first metadata further comprises the analytics associated with the location of the user device.

11. A non-transitory computer readable medium having stored thereon instructions for causing a processing circuitry to perform a process, the process comprising:
    identifying first metadata related to a type of a user device sending the communication delivery request, wherein the communication delivery request includes a voice call and data;

identifying second metadata related to a target of the communication delivery request;
identifying third metadata related to a type of current network connection;
determining a first optimal route for sending the voice call and a second optimal route for sending the data, wherein the determination is based on the identified first metadata, second metadata and third metadata;
routing the voice call over the first optimal route; and
routing the data over the second optimal route.

12. A system for optimizing a communication delivery request, the request comprising a voice call and data, from a user device, comprising:
a processing circuitry; and
a memory, the memory containing instructions that, when executed by the processing circuitry, configure the system to:
identify first metadata related to a type of a user device sending the communication delivery request, wherein the communication delivery request includes a voice call and data;
identify second metadata related to a target of the communication delivery request;
identify third metadata related to a type of current network connection;
determine a first optimal route for sending the voice call and a second optimal route for sending the data, wherein the determination is based on the identified first metadata, second metadata and third metadata;
route the voice call over the first optimal route; and
route the data over the second optimal route.

13. The system of claim 12, further comprising:
generate a first signature based on the voice call captured by the user device;
generate a second signature based on the data collected from the user device; and,
generate a complex signature wherein the complex signature comprises the first signature and the second signature.

14. The system of claim 13, further comprising:
route, over the first optimal route, the complex signature to the communication target together with the voice call; and,
route, over the second optimal route, the complex signature to the communication target together with the data.

15. The system of claim 12, further comprising:
monitor performance of the current network connection;
modify the first optimal route and the second optimal route upon detection of changes in the performance of the current network connection; and
route the voice call through the modified first optimal route and the data through the modified second optimal route.

16. The method of claim 15, wherein the changes in the performance are determined based on a preconfigured threshold.

17. The method of claim 16, wherein the predetermined performance network threshold is dynamically updated based on at least one of: earlier requests made by the user device, data stored in at least one database, and feedback from a communication target.

18. The system of claim 12, further comprising:
identify a current location of the user device.

19. The system of claim 12, wherein the first metadata further comprises the user device location.

20. The system of claim 12, further comprising:
retrieve, from a database, analytics associated with the location of the user device.

21. The system of claim 20, wherein the first metadata further comprises the analytics associated with the location of the user device.

* * * * *